United States Patent [19]
Qian

[11] Patent Number: 6,107,753
[45] Date of Patent: Aug. 22, 2000

[54] RADIO FREQUENCY ELECTRONIC BALLAST WITH INTEGRATED POWER FACTOR CORRECTION STAGE

[75] Inventor: Jinrong Qian, Croton-on-Hudson, N.Y.

[73] Assignee: Philips Electronics North America Corporation, New York, N.Y.

[21] Appl. No.: 09/216,263

[22] Filed: Dec. 18, 1998

[51] Int. Cl.$^7$ .................................................. H05B 41/16
[52] U.S. Cl. ..................... 315/247; 315/224; 315/209 R; 315/244; 315/248
[58] Field of Search .................................. 316/247, 248, 316/209 R, 224, 244, 200 R, DIG. 7

[56] References Cited

U.S. PATENT DOCUMENTS

| | | | |
|---|---|---|---|
| 5,142,201 | 8/1992 | Wessels | 315/209 R |
| 5,371,440 | 12/1994 | Liu et al. | 315/209 R |
| 5,404,082 | 4/1995 | Hernandez et al. | 315/219 |
| 5,406,177 | 4/1995 | Nerone | 315/307 |
| 5,446,350 | 8/1995 | El-Hamamsy et al. | 315/248 |
| 5,751,115 | 5/1998 | Jayaraman et al. | 315/225 |
| 5,798,617 | 8/1998 | Moisin | 315/247 |
| 5,917,290 | 6/1999 | Shen et al. | 315/209 R |

FOREIGN PATENT DOCUMENTS

| | | |
|---|---|---|
| 0395776A1 | 11/1990 | European Pat. Off. . |
| 0726696A2 | 8/1996 | European Pat. Off. . |

*Primary Examiner*—Haissa Philogene
*Attorney, Agent, or Firm*—Bernard Franzblau

[57] ABSTRACT

An electronic ballast having an RF resonant inverter and RF feedback from the inverter which provides power factor correction. The feedback is provided by a capacitor coupled between an RF resonant tank circuit of the resonant inverter and a low frequency point in the ballast. Such feedback integrates the power factor correction stage with the RF resonant inverter stage and eliminates a switch and its controller. Electronic ballasts operating at RF frequencies require fast switching isolation diodes. Ultra-fast silicon diodes with very short recovery times, which have been used as such isolation diodes, are sensitive to ambient temperature and deteriorate the power factor and total line current harmonic distortion of the ballast. Use of either GaAs or silicon carbide isolation diodes instead of silicon diodes provides the ballast with a high power factor and a low total harmonic distortion.

23 Claims, 1 Drawing Sheet

RADIO FREQUENCY ELECTRONIC BALLAST WITH INTEGRATED POWER FACTOR CORRECTION STAGE

BACKGROUND OF THE INVENTION

This invention relates to a radio frequency ("RF") electronic ballast with power factor correction for induction-coupled gas discharge lamps, and particularly to an electronic ballast for such lamps which integrates the power factor correction function with the ballast's inverter.

An induction lamp (electrodeless fluorescent lamp) may be operated at radio frequencies, e.g., 2.65 MHz. As shown in FIG. 1, a conventional electronic ballast 10 for an induction lamp 12 powered from the AC line may include a bridge rectifier 14, a DC filter capacitor Cb and an RF resonant inverter 16 coupled to an output coil La. The output coil La, which is excited by RF energy from the inverter 16, is inductively coupled to the lamp 12. When power factor correction is desired, a power factor correction stage 18 is coupled to the output of the rectifier 14, and with the filter capacitor $C_B$ provides a power factor corrected DC voltage to the inverter 16. This approach uses two-stages, the power factor correction stage 18 to provide a DC output voltage and the inverter stage 16 to provide the RF energy to the output coil La.

The ballast 10 includes conventional fast reverse recovery, silicon isolating diodes D1 and D2, an input or boost inductor Li (e.g., PC40 EF25/11), and an inductor Lf and capacitor Cf which form a low pass input filter. The inverter 16, which is also conventional, includes two switches S1 and S2 connected as a half bridge resonant inverter, and a resonant tank 20 comprising inductor Lr, and capacitors Cs and Cp. The power factor correction stage 18, which is conventional, includes a switch S3. A conventional control circuit, not shown, controls the inverter switches S1 and S2, and another conventional control circuit, not shown, controls the power factor correction switch S3.

Energy has to be processed twice in the ballast 10, once by the power factor correction stage 18 and once by the inverter 16. Therefore, power conversion efficiency could be low. Additionally, the number of components required for the separate power factor correction and RF energy generation stages is high, which increases cost.

U.S. Pat. No. 5,446,350 discloses an RF electronic ballast for an electrodeless induction lamp including an RF resonant tank circuit with an additional capacitor in the resonant tank circuit, which the patent states reduces the phase angle presented to the ballast, and thereby lowers the sensitivity of the ballast to component and lamp variations.

The following documents disclose the use of feedback in electronic ballasts which are direct or transformer coupled to the lamps (and not electrodeless) U.S. Pat. No. 5,404,082, European Patent Publications EP 395,776 and EP 726,696.

None of the documents cited above employs feedback in an RF electronic ballast for an electrodeless induction lamp to achieve power factor correction.

OBJECTS AND SUMMARY OF THE INVENTION

It is an object of this invention to provide power factor correction in a RF electronic ballast for an electrodeless induction lamp without a separate power factor correction stage.

The invention achieves this object by providing an electronic ballast having a RF resonant inverter and RF feedback from the inverter which provides power factor correction. This approach integrates the power factor correction stage with the RF resonant inverter stage. The RF feedback is provided by a feedback loop from an RF point in the inverter to a low frequency point in the ballast, e.g., the DC input to the inverter or the low frequency (e.g., a line frequency) input to the ballast. In a preferred embodiment, the RF inverter includes an RF resonant tank circuit which is the source of the RF feedback.

The RF feedback is believed to dynamically increase the conduction angle of the AC to DC converter of the line rectifier, and thereby provide power factor correction.

In a preferred embodiment, the feedback is provided by a capacitor from the RF resonant tank circuit of the inverter. The feedback capacitor may be coupled to the DC input to the inverter, or to the AC input to an AC to DC converter, e.g., a rectifier. The value of this feedback capacitor is selected to provide RF feedback to achieve power factor correction, as indicated above, and is dependent upon the RF power delivered by the RF resonant tank circuit to the lamp. The higher the output power, the larger the value of the feedback capacitor to provide sufficient RF energy to change the conduction angle of the rectifier.

Other objects are to provide an RF electronic ballast with an RF resonant inverter that is less sensitive to temperature and that has low total harmonic distortion ("THD"). Ballasts operating at RF frequencies (e.g., 2.65 MHz) require fast-switching isolation diodes that have a very short reverse recovery time, and very small junction capacitance, and are capable of hard-switching operation. Ultra-fast silicon diodes usually have a very short reverse recovery time of 20 ns. But this reverse recovery time is sensitive to ambient temperature. The higher the temperature, the longer the reverse recovery time and the higher the switching loss, which may cause thermal runaway. Also, the parasitic capacitance of the isolation diodes will deteriorate the power factor and total line current harmonic distortion. The invention achieves these objects of less sensitivity to temperature and low THD by providing either GaAs or silicon carbide isolation diodes, which have shorter reverse recovery times and smaller parasitic capacitance than silicon diodes, even at high junction temperatures, and are less sensitive to high temperatures than silicon diodes.

The invention reduces the number of components required as compared to the conventional ballast represented in FIG. 1, and the inventive ballast requires a smaller boost inductor than does the ballast of FIG. 1. In addition, the inventive ballast operates with continuous line current over a wide range of the line cycle, which allows the use of a smaller input line filter and a smaller electromagnetic interference filter. Further, the inventive ballast can operate at constant frequency with low crest factor and zero voltage switching.

The invention thus provides increased performance and high power density with simple control, while significantly reducing cost.

BRIEF DESCRIPTION OF THE DRAWINGS

The invention is illustrated in the figures of the accompanying drawings which are meant to be exemplary and not limiting, in which like numerals in the different figures refer to like or corresponding parts, and in which.

DESCRIPTION OF THE PREFERRED EMBODIMENTS

Figure 1:
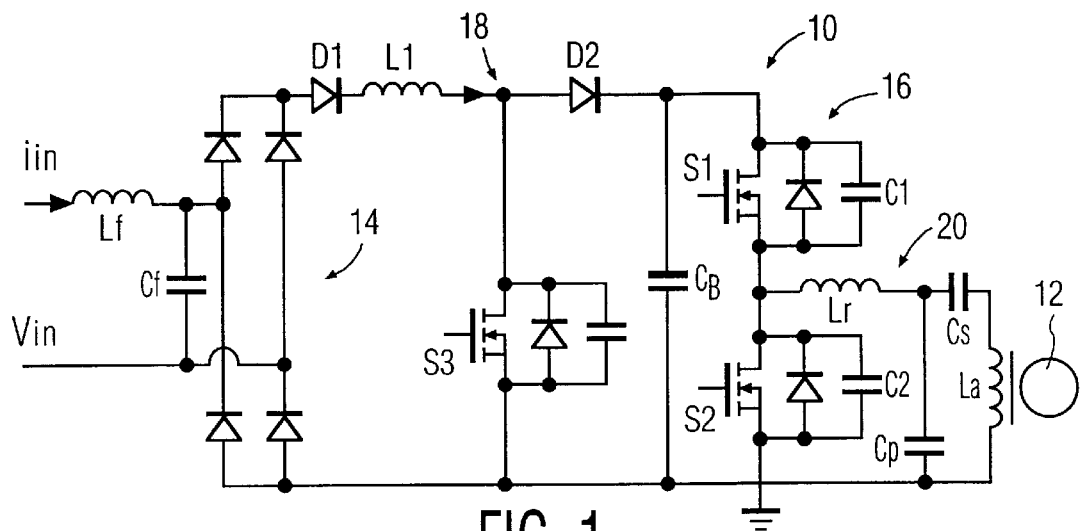
FIG. 1 is a schematic circuit diagram of a conventional electronic ballast for an electrodeless RF induction lamp which includes separate power factor correction and RF resonant inverter stages.
Figure 2:
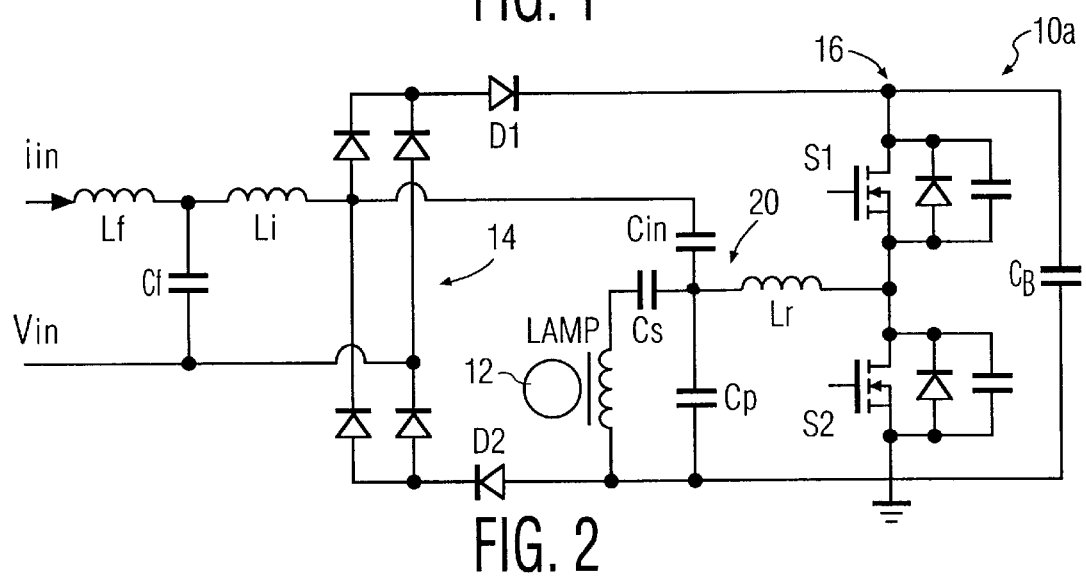
FIGS. 2 and 3 are schematic circuit diagrams of electronic ballasts for electrodeless RF induction lamps in which the power factor correction stage and the RF resonant inverter stage are integrated in accordance with the invention by feedback from the RF tank circuit of the resonant inverter stage.

The inventive ballast 10a represented in FIG. 2 is similar to that of ballast 10 represented in FIG. 1, except that the boost inductor Li is coupled to the AC input to the rectifier 14, an isolating diode D1, D2 is coupled to the positive and negative DC outputs, respectively, of the rectifier 14, and the power factor correction stage 18 in FIG. 1 is replaced by a feedback capacitor Cin coupled from the RF resonant tank circuit 20 to the AC input to the rectifier 14 . Specifically, capacitor Cin is coupled from the junction of capacitors Cp and Cs and inductor Lr in the tank circuit 20 to the junction of the boost inductor Li and the AC input of the rectifier 14. The input inductor Li and the low pass input filter (capacitor Cf and inductor Lf) filter the feedback and prevent any RF from entering the AC line.

Figure 3:
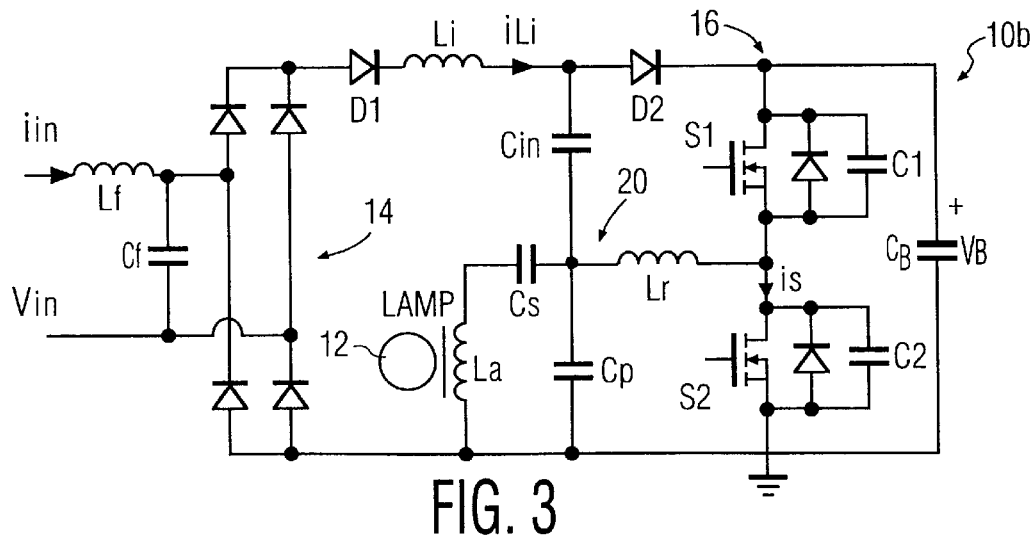

The inventive ballast 10b represented in FIG. 3 is similar to that of ballast 10 represented in FIG. 1, except that the power factor correction stage 18 in FIG. 1 is replaced by a feedback capacitor Cin coupled from the RF resonant tank circuit 20 to the DC input of the inverter 16, i.e., to the output of the boost inductor Li. Specifically, capacitor Cin is coupled from the junction of capacitors Cp and Cs and inductor Lr in the tank circuit 20 to the junction of the boost inductor Li and the fast recovery diode D2 at the input to the inverter 16.

In both the FIG. 2 and FIG. 3 embodiments, capacitor Cin integrates the power factor correction stage with the resonant inverter 16, and is coupled to feedback an RF signal from the tank circuit 20 to achieve power factor correction. The boost inductor Li makes the input current continuous over a wide range of the line cycle. Therefore, the value of capacitor Cin can be much smaller than it could otherwise be without a boost inductor Li, and the modulation effect of capacitor Cin on the resonant inverter 16 is minimized.

As indicated above, the feedback capacitor Cin provides an RF signal at a level which is believed to cause the rectifier 14 to increase the conduction angle, which increases the power factor. The value of the capacitor Cin is dependent upon the power delivered to the lamp. For example, for an 85 W lamp and an RF resonant inverter operating at 2.65 Mhz., the value of Cin is 180 pf.

The parasitics of the power devices in the ballast play an important role in circuit performance in high frequency operation. As discussed above, the isolation diodes D1 and D2 in both FIGS. 2 and 3 are either GaAs or silicon carbide diodes, which have much smaller parasitic capacitance and shorter reverse recovery time even at high temperature than silicon diodes due to a high energy band gap.

Tests of ballast 10b represented in FIG. 3, with GaAs and with silicon carbide diodes and with components having the values given below, yielded about 15% THD with about 0.98 power factor, as compared to about 38% THD with about 0.92 power factor for silicon diodes.

Li RM5 PC 40 (15 turns 54/44 litz wire)
Lr EP25 3F4
Cin 180 pf
Cp 390 pf
Cs 1.5 nf
Cb 47 uf, 450 v
S1,S2 IR F820

The main advantages of the inventive RF ballast are:
1. Only two power switches and one controller are used while the conventional approach uses three power switches and two controllers.
2. The size and volume of the boost inductor Li is significantly reduced, for example only 20% of that in the conventional approach. Therefore, the cost of the magnetic components is reduced.
3. The line input is continuous over a wide range of the line cycle. So, the line input filter and EMI filter can be smaller than that of the conventional approach.
4. The inventive RF ballast can operate at constant frequency with low crest factor and zero voltage switching.
5. The inventive RF ballast has low THD and is less sensitive to temperature.

Therefore, the invented RF electronic ballast provides a significant cost reduction and high power density with simple control. These features are very attractive.

While the invention has been described and illustrated in connection with preferred embodiments, many variations and modifications, as will be apparent to those of skill in the art, may be made without departing from the spirit and scope of the invention. For example, the RF resonant inverter may be constructed differently than the RF resonant inverter 16, and can operate over a range of radio frequencies, and the RF feedback can be achieved in ways other than illustrated in FIGS. 2 and 3. The invention as set forth in the appended clams is thus not limited to the precise details of construction set forth above as such variations and modifications are intended to be included within the spirit and scope of the invention as set forth in the defined claims.

What is claimed is:

1. A ballast for an electrodeless lamp, comprising:
   an AC to DC converter having an input adapted to be coupled to low frequency AC power and having an output;
   an RF resonant inverter having an input coupled to the output of the AC to DC converter to receive DC power and a coil which is energized with RF power generated by the inverter and which is adapted to be inductively coupled to the lamp; and
   an RF feedback path which couples RF power from the RF inverter to a low frequency point in the ballast at a level to achieve power factor correction.

2. The ballast as recited in claim 1 wherein the low frequency point is the input to the RF resonant inverter.

3. The ballast as recited in claim 1 wherein the low frequency point is the input to the AC to DC converter.

4. The ballast as recited in claim 1 wherein the inverter includes an RF tank circuit and the feedback path comprises a capacitor coupled to the RF tank circuit and to the low frequency point of the ballast.

5. The ballast as recited in claim 4 wherein the capacitor is coupled to the input of the RF resonant inverter.

6. The ballast as recited in claim 4 wherein, the low frequency point is the input to the AC to DC converter to which point the capacitor is coupled.

7. The ballast as recited in claim 1 comprising an input inductor having an input adapted to be coupled to the AC line and an output, a rectifier having an input coupled to the output of the inductor and an output coupled to the input of the inverter, and wherein the inverter comprises an RF resonant tank circuit and the feedback path comprises a capacitor electrically coupled to the RF resonant tank circuit and to the input to the rectifier, wherein the value of the capacitor is selected to provide power factor correction.

8. The ballast as recited in claim 1 comprising a rectifier having an input adapted to be coupled to an AC line and an output, and an input inductor coupled to the output of the rectifier and the input of the inverter, and wherein the inverter comprises an RF resonant tank circuit and the feedback path comprises a capacitor coupled to the RF resonant tank circuit and to the input of the inverter, wherein the value of the capacitor is selected to provide power factor correction.

9. The ballast as recited in claim 1 wherein said feedback path comprises a capacitor for capacitively coupling said RF power from the RF inverter to said low frequency point in the ballast.

10. The ballast as recited in claim 1 wherein said feedback path comprises only capacitive coupling of said RF power from the RF inverter to said low frequency point in the ballast.

11. The ballast as recited in claim 1 wherein said feedback path is a non-magnetic electric circuit path.

12. The ballast as recited in claim 1 wherein said resonant inverter includes a resonant inductor and a resonant capacitor in circuit to form an LC resonant circuit, and with the resonant capacitor decoupled from the lamp and the RF power fed back to the low frequency point being independent of lamp current.

13. The ballast as recited in claim 1 wherein said resonant inverter includes a resonant inductor and a resonant capacitor in circuit to form an LC resonant circuit, and the feedback path comprises a capacitor coupling a junction point between the resonant inductor and the resonant capacitor to said low frequency point of the ballast.

14. The ballast as recited in claim 4 wherein the value of the capacitor is selected on the basis of the power delivered to the electrodeless lamp.

15. A ballast for an electrodeless lamp, comprising:
an input inductor adapted to be coupled to a source of AC power;
a rectifier having an AC input coupled to an output of the inductor;
an RF resonant inverter having an input coupled to the output of the rectifier, an RF resonant tank circuit and an output adapted to be inductively coupled to the lamp; and
a feedback capacitor coupled to the RF resonant tank circuit and the AC input of the rectifier;
wherein the value of the capacitor is selected to provide power factor correction.

16. The ballast as claimed in claim 15 comprising a first fast switching isolation diode coupled between a positive DC output of the rectifier and the inverter and a second fast switching isolation diode coupled between a negative DC output of the rectifier and the inverter.

17. The ballast as claimed in claim 16 wherein the fast switching isolation diodes comprise GaAs diodes.

18. The ballast as claimed in claim 16 wherein the fast switching isolation diodes comprise silicon carbide diodes.

19. A ballast for an electrodeless lamp, comprising:
a rectifier adapted to be coupled to a source of AC power;
an input inductor coupled to an output of the rectifier;
an RF resonant inverter having an input coupled to an output of the inductor, an RF resonant tank circuit and an output adapted to be inductively coupled to the lamp; and
a feedback capacitor coupled to the tank circuit and to the input of the inverter;
wherein the value of the capacitor is selected to provide power factor correction.

20. The ballast as claimed in claim 19 comprising a first fast switching isolation diode coupled between a positive output of the rectifier and the input of an inductor and a second fast switching isolation diode coupled to the output of the inductor and to the input of the inverter.

21. The ballast as claimed in claim 20 wherein the fast switching isolation diodes comprise GaAs diodes.

22. The ballast as claimed in claim 20 wherein the fast switching isolation diodes comprise silicon carbide diodes.

23. A ballast for a gas discharge lamp which comprises:
a rectifier adapted to be coupled to a source of AC power and an RF resonant inverter coupled to the rectifier and adapted to be coupled to the lamp, and first and second serially arranged fast switching isolation diodes coupling the inverter to respective first and second output terminals of the rectifier, wherein the isolation comprise either GaAs diodes or silicon carbide diodes.

\* \* \* \* \*